(12) United States Patent
Somarakis et al.

(10) Patent No.: US 12,411,951 B2
(45) Date of Patent: Sep. 9, 2025

(54) SYSTEM AND METHOD FOR SECURITY CONTROL IN CYBER-PHYSICAL SYSTEMS WITH DELAY-INDUCED FEEDBACK WATERMARKING

(71) Applicant: Palo Alto Research Center Incorporated, Palo Alto, CA (US)

(72) Inventors: Christoforos Somarakis, Gilroy, CA (US); Raman Goyal, Mountain View, CA (US); Erfaun Noorani, Fairless Hills, PA (US); Shantanu Rane, Palo Alto, CA (US)

(73) Assignee: Xerox Corporation, Norwalk, CT (US)

( * ) Notice: Subject to any disclaimer, the term of this patent is extended or adjusted under 35 U.S.C. 154(b) by 309 days.

(21) Appl. No.: 18/087,477

(22) Filed: Dec. 22, 2022

(65) Prior Publication Data

US 2024/0211593 A1    Jun. 27, 2024

(51) Int. Cl.
*G06F 21/55* (2013.01)
*G06F 21/62* (2013.01)

(52) U.S. Cl.
CPC ........ *G06F 21/556* (2013.01); *G06F 21/6218* (2013.01)

(58) Field of Classification Search
CPC ................ G06F 21/556; G06F 21/6218
See application file for complete search history.

(56) References Cited

U.S. PATENT DOCUMENTS

| 7,515,731 B2* | 4/2009 | Koto ..................... G06T 1/0028 382/100 |
| 8,935,171 B1* | 1/2015 | Blesser ................ G06T 1/0021 380/236 |
| 10,079,024 B1* | 9/2018 | Bhimanaik ............ G10L 17/02 |
| 11,159,540 B2* | 10/2021 | Abbaszadeh ....... H04L 63/1416 |
| 2002/0021721 A1* | 2/2002 | Jiang .................... H04B 7/1858 370/445 |
| 2011/0265505 A1* | 11/2011 | Schwartz ............... F25B 9/145 62/215 |
| 2021/0185085 A1* | 6/2021 | Wang ................. H04L 63/1425 |
| 2022/0217159 A1* | 7/2022 | Ito ....................... H04W 12/121 |

OTHER PUBLICATIONS

"Mo et al., Secure Control Against Replay Attacks, Oct. 2, 2009, IEEE, Allerton House, pp. 911-918" (Year: 2009).*

* cited by examiner

*Primary Examiner* — Dao Q Ho (57) ABSTRACT

A system and a method for secure control of a physical system are described. During operation, the system can obtain measurement of one or more sensors associated with the physical system. The system then estimates a state of the physical system based on the measurement of the sensors. Subsequently, the system generates a feedback control signal based on the estimated state and generates a watermarking signal based on a stored estimated state of the physical system at a previous time instant. The system then generates a watermarked control signal by combining the feedback control signal and the watermarking signal and applies the watermarked control signal to the physical system to regulate the state of the physical system, thereby facilitating secure control of the physical system.

15 Claims, 8 Drawing Sheets

FIG. 1A (PRIOR ART)

| U | J |
|---|---|
| 0.000 | 0.7907 |
| 0.015 | 1.0415 |
| 0.030 | 1.7935 |
| 0.050 | 3.5757 |

| Watermarking Signal | LQR Cost |
|---|---|
| No watermarking | 0.7907 |
| Delay-induced watermarking | 0.8712 |
| Gaussian watermarking | 1.0415 |

SYSTEM AND METHOD FOR SECURITY CONTROL IN CYBER-PHYSICAL SYSTEMS WITH DELAY-INDUCED FEEDBACK WATERMARKING

RELATED APPLICATION

This application is related to U.S. application Ser. No. 17/939,577, titled "METHOD AND ARCHITECTURE FOR PROVIDING INTEGRATED DESIGN OF CYBER-PHYSICAL SYSTEM WITH WATERMARKING," by inventors Raman Goyal, Christoforos Somarakis, Erfaun Noorani, Aleksandar B. Feldman, and Shantanu Rane, filed on 7 Sep. 2022, the disclosure of which is incorporated herein by reference in its entirety.

BACKGROUND

Field

This disclosure is generally related to the secure control of physical systems. More specifically, this disclosure is related to using a time-delayed state-estimate watermarking scheme to ensure security while controlling the physical systems.

Related Art

Cyber-physical systems (CPSs) are the integrations of computation, communication, and control that achieve the desired performance of physical processes. CPSs, especially when used in critical infrastructure systems (e.g., power grids, financial markets, and commercial and military communication networks), require security. However, the complex nature of CPSs makes such systems prone to compromise by malicious actors and has led to an increase in malicious cyber-attacks, especially in industrial control systems.

One common type of malicious cyber-attack is the replay attack, in which valid data transmission is maliciously or fraudulently repeated. An effective method for detecting the replay attack can include the use of watermarking signals in the cyber-physical systems. Watermarking can be considered a method of data authentication that infuses untraceable and unrepeatable signals (e.g., additive white noise) into the output of the CPS. A CPS secured by watermarking can be referred to as a watermarked physical system (or watermarked system for short).

The presence of the watermarking signal can indicate whether an output of the watermarked system is the current output. In particular, the watermarked system induces a discrepancy between a replay signal and a current output signal because the corresponding watermarks on the respective signals can be different. However, since the watermarking signal is typically incorporated as extra noise, the overall performance of the watermarked system can degrade due to the watermarking process.

SUMMARY

One embodiment provides a system and method for secure control of a physical system. During operation, the system can obtain measurement of one or more sensors associated with the physical system. The system then estimates a state of the physical system based on the measurement of the sensors. Subsequently, the system generates a feedback control signal based on the estimated state and generates a watermarking signal based on a stored estimated state of the physical system at a previous time instant. The system then generates a watermarked control signal by combining the feedback control signal and the watermarking signal and applies the watermarked control signal to the physical system to regulate the state of the physical system, thereby facilitating secure control of the physical system, against replay attacks.

In a variation on this embodiment, the system can perform a chi-square detection to detect a replay attack on the physical system.

In a further variation, the system can output an alarm signal in response to detecting a replay attack.

In a variation on this embodiment, while generating the feedback control signal, the system can apply a linear-quadratic-Gaussian (LQG) control scheme.

In a variation on this embodiment, while generating the watermarking signal, the system can generate a random delay within a predetermined range based on a predetermined probability mass function, obtaining the stored estimated state based on the random delay such that a difference between the previous time instant and a current time instant equals the random delay, and multiplying the stored estimated state by a predetermined scale factor.

In a further variation, while generating the random delay, the system can generate the random delay for each time instant or generating the random delay for multiple consecutive time instants.

In a further variation, the system can tune the predetermined range and/or the predetermined probability mass function to ensure that the watermarking signal does not cause instability in the physical system.

In a further variation, the system can tune the predetermined scale factor to ensure that the watermarking signal is within an admissible input range of the physical system.

In a further variation, the predetermined probability mass function can include a Gaussian distribution function or a uniform distribution function.

BRIEF DESCRIPTION OF THE FIGURES

In the figures, like reference numerals refer to the same figure elements.

DETAILED DESCRIPTION

The following description is presented to enable any person skilled in the art to make and use the embodiments and is provided in the context of a particular application and its requirements. Various modifications to the disclosed embodiments will be readily apparent to those skilled in the art, and the general principles defined herein may be applied to other embodiments and applications without departing from the spirit and scope of the present disclosure. Thus, the present invention is not limited to the embodiments shown but is to be accorded the widest scope consistent with the principles and features disclosed herein.

Overview

Embodiments described herein provide a system and method for generating watermarking signals in control systems. Instead of using additive noise as watermarking signals (which can lead to performance degradation), the proposed solution uses delayed state estimates of the system under control as the watermarking signals. More specifically, the control system can store past estimated states of the system within a predetermined time window and generate watermarking signals by applying a random delay to the past states and then multiplying the randomly delayed states by a predetermined scale factor. The system also determines the constraints (e.g., upper and lower bounds) to be applied to the random delay and the scale factor to ensure that the generated watermarking signals are admissible (i.e., they are within the allowed range of input of the system and do not cause instability in the system). Compared with random noise watermarking signals, the delay-induced watermarking signals can provide fast detection of relay attacks with reduced degradation in system performance.

Time-Delayed Watermarking

Figure 1A:
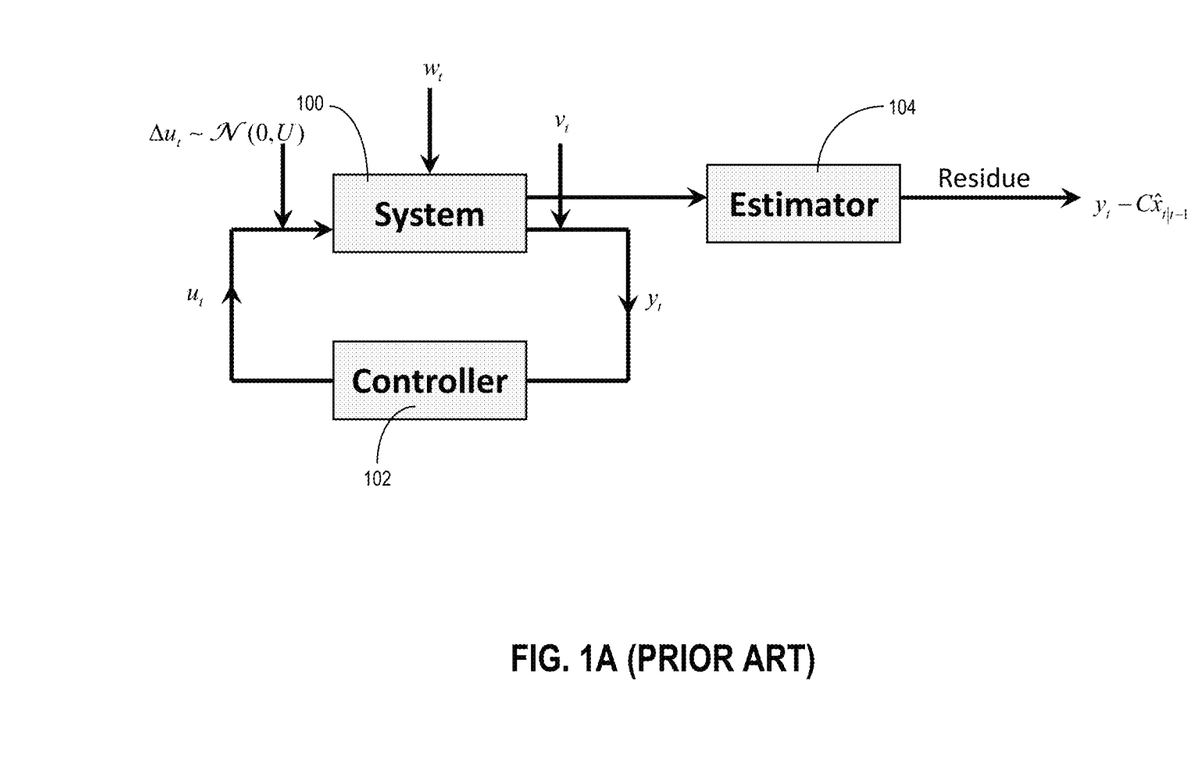
FIG. 1A illustrates an exemplary watermarked system, according to prior art.

FIG. 1A illustrates an exemplary watermarked system, according to prior art. In FIG. 1A, a physical system (e.g., a CPS) 100 can be controlled by a controller 102. More specifically, system 100 and controller 102 can form a control loop, where controller 102 controls the state of system 100 based on the output of system 100. Assuming system 100 is a discrete-time linear time-invariant (LTI) system, the system dynamics can be expressed as:

$$x_{t+1} = Ax_t + Bu_t + Dw_t, \quad (1)$$

$$y_t = Cx_t + v_t, \quad (2)$$

where $x_t \in \mathbb{R}^{n_x}$ is the state of the system at time step t, and $u_t \in \mathbb{R}^{n_u}$ is the control input at time step t. $A \in \mathbb{R}^{n_x \times n_u}$ and $B \in \mathbb{R}^{n_x \times n_u}$ are the state and input distribution matrices, respectively. The system dynamics are disrupted by $w_t \square \mathcal{N}(0, W)$, $\forall t$, with $W \in \mathbb{R}^{n_w \times n_w}$ being the system covariance and $D \in \mathbb{R}^{n_x \times n_w}$ being the noise distribution matrix. The output of system 100 at time t (i.e., $y_t \in \mathbb{R}^{n_y}$ is an imperfect measurement of the system state through output matrix $C \in \mathbb{R}^{n_y \times n_x}$, with sensor noise $v_t \square \mathcal{N}(0, V)$, $\forall t$, with $V \in \mathbb{R}^{n_v \times n_v}$ as the sensor covariance.

To prevent replay attacks, a watermarking signal $\Delta u_t$ is added to the control input $u_t$. A state estimator 104 can estimate the system state $\hat{x}$ and a residue signal can be computed as $r = y - C\hat{x}$, where $\hat{x}$ is the estimated system state. The residue signal can be used to detect anomalies or potential attacks. In the absence of sensor and process noises (i.e., {w} and {v} in Equations (1) and (2)), it should hold that $y_t \to C\hat{x}_{t|t+1}$ for $t \sqcap 1$. Therefore, any large and consistent discrepancies in the statistical behavior of $r_t$ for large t should indicate a potential attack. A chi-square or $\chi^2$ detector (not shown in FIG. 1) can be used to detect the relay attacks based on the residue. The $\chi^2$ detector is a standard tool in system diagnostics that leverages the estimated states to detect data incoherences that can be measured from the dynamic residue. The $\chi^2$ detector output over an observation window T can be defined as:

$$g_k^{(T)} = \sum_{t=k}^{k+T} (y_t - C\hat{x}_{t|t-1})^T \Sigma_R^{-1} (y_t - C\hat{x}_{t|t-1}), \quad (3)$$

where the matrix $\Sigma_R$ depends on system properties.

During a replay attack, the attacker can have access to the system's output $y_t$ and can transmit an outdated (asynchronous) copy of the system's output $y_t$ and replay it indefinitely. As a result, during the attack interval $\mathcal{T}$, both the user and all other system components (including the Kalman filter and the feedback controller in controller 102) receive a compromised signal:

$$y_t^{attack} = y_{t-\sigma}, t \in \mathcal{T}, \quad (4)$$

which places the system's behavior in jeopardy. The attack model can be expressed as:

$$x'_{t+1} = Ax'_t + Bu'_t + Dw'_t, \quad (5)$$

$$y'_t = Cx'_t + v'_t. \quad (6)$$

Therefore, the residue signal in the event of the replay attack becomes $r' = y' - C\hat{x}$, where y' is the compromised system measurement. During attack, the attacker replays a previous $y_t$ to make the fake reading look normal, resulting in the residue monitored by the $\chi^2$ detector (i.e., $y_t - C\hat{x}_{t|t-1}$) being replaced by $y'_t - C\hat{x}_{t|t-1}$. Accordingly, the $\chi^2$ detector output during the attack becomes:

$$g_k^{\prime(T)} = \sum_{t=k}^{k+T} (y'_t - C\hat{x}_{t|t-1})^T \Sigma_R^{-1} (y'_t - C\hat{x}_{t|t-1}). \quad (7)$$

In conventional approaches, the watermarking signal is a Gaussian noise (i.e., $\Delta u_t \square \mathcal{N}(0, U)$), which is assumed to be statistically independent of other noise sources (e.g., the sensor and process noises). With the addition of the Gaussian noise watermarking signal, the system dynamics described in Equation (1) become:

$$x_{t+1} = Ax_t + Bu_t + B\Delta u_t + Dw_t. \quad (8)$$

It can be shown that stronger watermarking signals (i.e., a larger U) can increase the detectability of the attack (e.g., the replay attack can be detected faster). However, the noise added to the control input can also decrease the performance of the control system. More specifically, the added noise can increase the cost function for the feedback control. Assuming controller 102 implements a linear-quadratic-Gaussian (LQG) control scheme, the cost function can be expressed as:

$$J = \lim_{t \to \infty} \mathbb{E}\left[\frac{1}{t}\sum_{k=0}^{t-1} x_k^T Q x_k + u_k^T R u_k\right], \quad (9)$$

where $u = u^C + \Delta u$ is the control feedback, and Q and R are the weighting matrices.

Figure 1B:
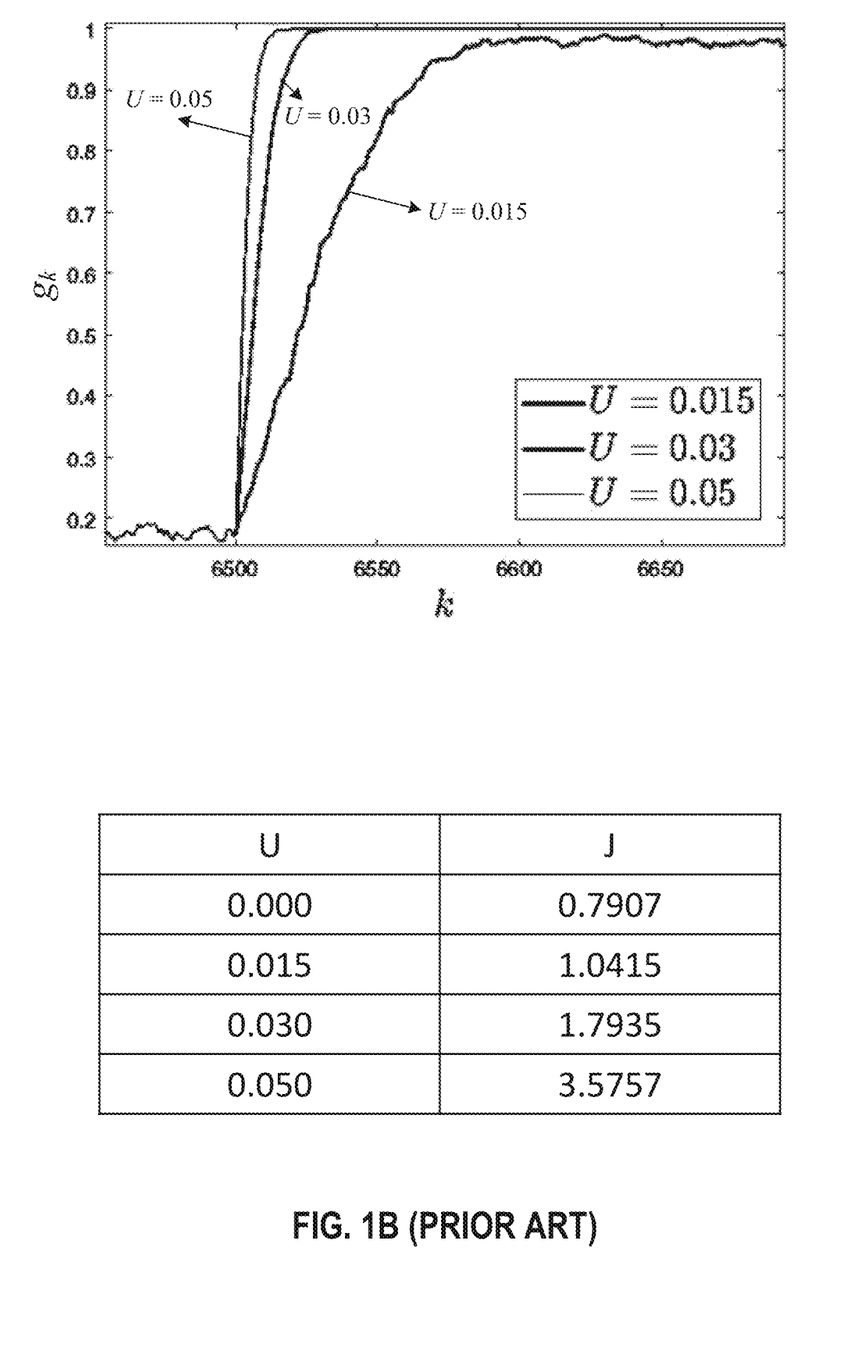
FIG. 1B illustrates the performance of existing noise-based watermarking schemes, according to prior art.

FIG. 1B illustrates the performance of existing noise-based watermarking schemes, according to prior art. The top drawing shows the $\chi^2$ detector output (i.e., $g_k$) for watermarking signals of different intensities (i.e., different U), and the table at the bottom of FIG. 1B shows the corresponding value of the cost functions. As can be seen from FIG. 1B, the larger the U or the higher the watermarking intensity, the faster the detection of the attack. However, a larger U also leads to a higher cost, meaning that the performance of the control system is worse for the larger U.

To provide watermarking without causing significant degradation to the system performance (e.g., without significantly increasing the cost function), in some embodiments of the instant application, the control system can generate a watermarking signal using delayed system state estimates. When the control system implements the LQG control scheme, the feedback control signal can be expressed as:

$$u_t^{LQG} = -K_{\hat{x}} \hat{x}_t, \qquad (10)$$

where gains $K_{\hat{x}}$ is designed to minimize the cost function (i.e., the cost function shown in Equation (9)). In addition, a watermarking signal can be defined as:

$$u_t^{WM} = -K_\tau \hat{x}_{t-\tau_t}, \qquad (11)$$

where $K_t$ is the gain matrix used for scaling and $\tau_t$ is the time delay of the estimated state. Both $K_t$ and $\tau_t$ can be used as tunable design parameters when designing the watermarking signal. In some embodiments, the time delays are non-negative and have a predetermined upper bound (i.e., $\tau_t \in \{1, \ldots, \bar{\tau}\}$ for discrete-time delays). In further embodiments, at every time instant, the time delay $\tau_t$ changes randomly such that the sequence $\{\tau_t\}_{t \geq 0}$ can include independent and identically distributed (IID) random variables. The random delay variables can be statistically independent of the process noise and the sensor noise. With watermarking, the control feedback can be expressed as:

$$u_t = u_t^{LQG} + u_t^{WM} = -K_{\hat{x}} \hat{x}_t - K_\tau \hat{x}_{t-\tau_t}. \qquad (12)$$

Figure 2:
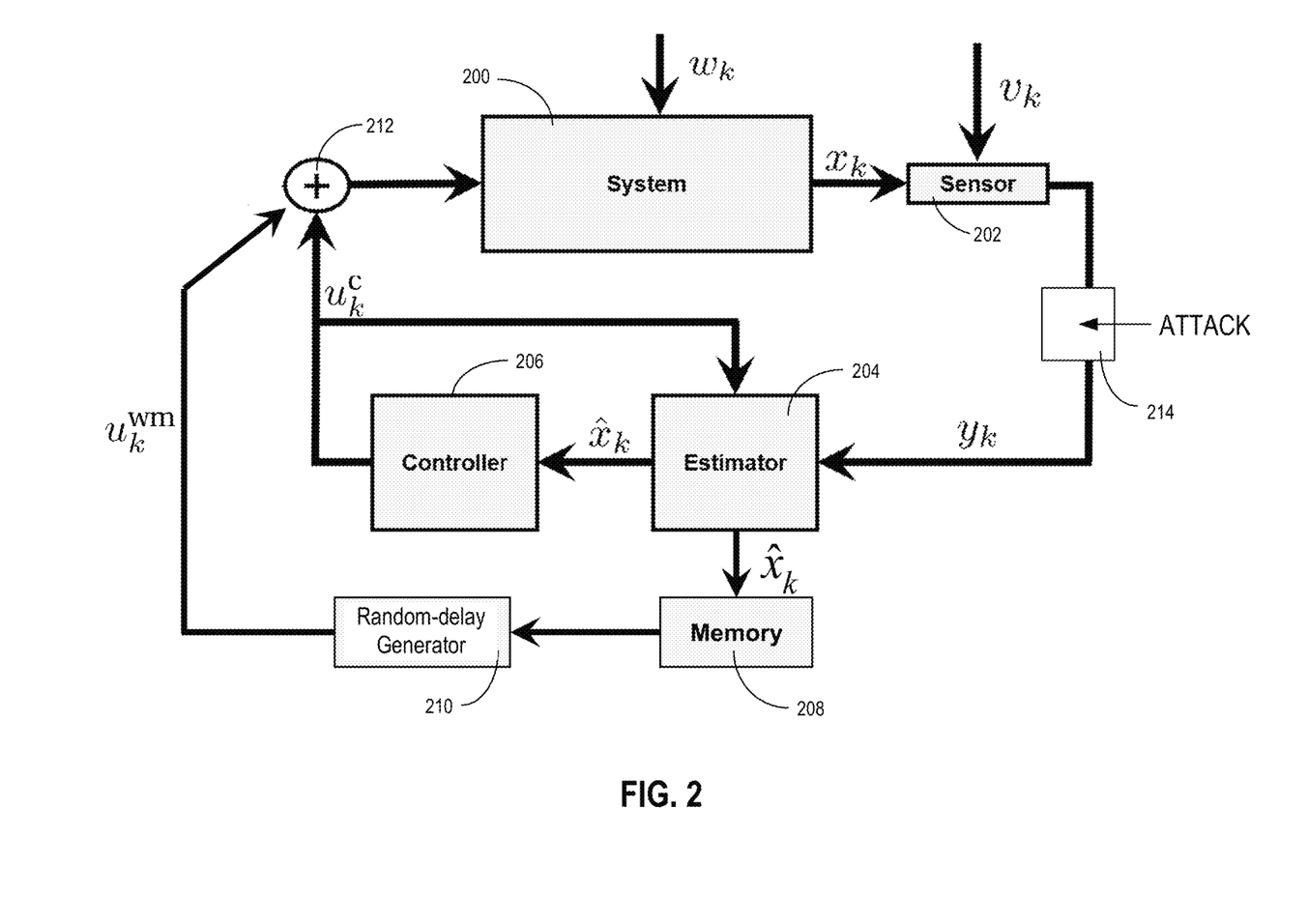
FIG. 2 illustrates the delay-induced watermarking scheme, according to one embodiment.

FIG. 2 illustrates the delay-induced watermarking scheme, according to one embodiment. Note that, because the system is assumed to be a discrete-time LTI, a time instant t can also be expressed as a sequence number k. FIG. 2 shows that, at a time step k, the state (denoted $x_k$) of a physical system 200 can affect the output or reading (denoted $y_k$) of a sensor 202. Processing noises (denoted $w_k$) and sensor noises (denoted $v_k$) are added to system 200 and sensor 202, respectively.

A state estimator 204 can estimate the state of system 200 based on the output or reading of sensor 202, and the estimated state is denoted $\hat{x}_k$. The estimated state $\hat{x}_k$ can be sent to a controller 206, which generates a feedback control signal (denoted $u_k^C$) based on the estimated state. In some embodiments, controller 206 can implement the LQG control scheme, and estimator 204 can include a Karman filter. The feedback control signal $u_k^C$ can also be sent back to estimator 204 to optimize the estimated state.

In addition, the estimated state is sent to a memory module 208 for storage. In some embodiments, memory module 208 can store estimated states of system 200 within a time window of a predetermined duration. For the discrete-time system, memory module 208 can store a predetermined number of time samples of the estimated state. For example, memory module 208 can store estimated states of system 200 within a time window $\{\tau_1, \ldots, \tau_2\}$, with $\tau_1$ and $\tau_2$ being the lower and upper bounds of the time window, respectively.

A random-delay generator 210 can generate a random delay based on a predetermined probability mass function (pmf). The pmf can be a uniform distribution function or other types of discrete probability distribution functions. A watermarking signal (denoted $u_k^{wm}$) can be generated based on the estimated states stored in memory 208 and the random delay generated by random-delay generator 210. More specifically, the watermarking signal can be expressed as:

$$u_k^{wm} = -K_k \hat{x}_{k-\tau_k}, \qquad (13)$$

where $K_k$ is the scale factor that indicates the intensity of the watermarking signal, and $\tau_k$ is a variable randomly selected from time window $\{\tau_1, \ldots, \tau_2\}$ according to a predetermined pmf. In other words, the watermarking signal $u_k^{wm}$ is a time-delayed-and-scaled version of the estimated state of system 200.

The feedback control signal $u_k^C$ and the watermarking signal $u_k^{wm}$ can be combined (e.g., by an adder 212) before being input to system 200 for feedback control. To ensure that the closed-loop control system is stable with the introduction of the delay-induced watermarking signal, the boundaries of the time delay and the scale factor (e.g., K) need to be carefully selected.

In some embodiments, the state estimator (e.g., a Kalman filter) can estimate the state of the system according to the following dynamics:

$$x_{t+1|t} = Ax_{t+1|t} + Bu_t + L(y_t - Cx_{t|t-1}), \qquad (14)$$

where L is the Kalman gain. The Kalman output is:

$$x_{t|t} = (I - MC)x_{t|t-1} + My_t, \qquad (15)$$

where M is the innovation gain. A more detailed discussion of the LQG control scheme is omitted here, and the scope of this disclosure is not limited by the control scheme. To determine the scale factor (i.e., K) and the pmf of the random time delay (i.e., $p_\tau$), one can first define and calculate a number of matrices:

$$\mathcal{A} = \begin{bmatrix} A - BK_{\hat{x}}MC & -BK_{\hat{x}}(I - MC) \\ (L - BK_{\hat{x}}M)C & A - BK_{\hat{x}}(I - MC) - LC \end{bmatrix},$$

$$\mathcal{B} = \begin{bmatrix} -BK_\tau MC & -BK_\tau(I - MC) \\ -BK_\tau MC & -BK_\tau(I - MC) \end{bmatrix}, \text{ and}$$

$$\Gamma = \begin{bmatrix} D & -BK_{\hat{x}}M & -BK_\tau M \\ 0 & -BK_{\hat{x}}M & -BK_\tau M \end{bmatrix}.$$

The following matrix equation can be solved for a given matrix C>0:

$$\mathcal{A}^T H \mathcal{A} - H = -C. \qquad (16)$$

The above equation can be solved to obtain $H = H^T > 0$ that exists and is unique. One can also define c>0 as the minimum eigenvalue of C and $0 < \underline{\eta} < \bar{\eta}$ the minimum and maximum eigenvalues of H, respectively. Next, one can define:

$$\alpha := \begin{cases} \dfrac{\|\bar{\eta} - c + \|\mathcal{A}^T H \mathcal{B}\|\|}{\bar{\eta}}, & c > |\mathcal{A}^T H \mathcal{B}| \\ \dfrac{\|\underline{\eta} - c + \|\mathcal{A}^T H \mathcal{B}\|\|}{\underline{\eta}}, & c \leq |\mathcal{A}^T H \mathcal{B}| \end{cases}, \qquad (17)$$

$$\beta := \bar{\eta}^{-1}(|\mathcal{A}^T H \mathcal{B}| + |\mathcal{B}^T H \mathcal{B}|), \qquad (18)$$

where $|\bar{\ }|$ is the 2-matrix norm.

If $\alpha+\beta<1$, then the system as defined by Equations (1) and (2) with the control input defined by Equation (12) using the Kalman filter (as defined by Equation (14)) as the state estimator (i.e., with the Kalman output defined by Equation (15)) can admit bounded solutions for time-delayed signals $\hat{x}_{t-\tau_t}$ with an arbitrary but bounded delay $\tau_t \leq \bar{\tau} < \infty$. In other words, one need to find a scale factor that ensures $\alpha+\beta<1$ such that the time-delayed-and-scaled state is admissible watermarking (i.e., it is within the acceptable input range of the system and will not destabilize the system). In some embodiments, the scale factor is chosen to be sufficiently small.

As can be seen from FIG. 2, the watermarking signal $u_k^{wm}$ affects the state of system 200 and that controller 206 optimizes the feedback control signal $u_k^C$ based on the estimated state $\hat{x}_k$ of system 200. This means that the optimization of both the watermarking signal $u_k^{wm}$ and the feedback control signal $u_k^C$ can be performed concurrently and codependently.

FIG. 2 also shows an attack-injection point 214, where an attacker can inject an outdated copy of the system's output. According to the attack model defined by Equations (5)-(6), the $\chi^2$ detector outputs without and with the addition of the watermarking signal in the feedback control are provided by Equations (3) and (7), respectively. To provide efficient detection of the replay attack, it is desirable to design a watermarking signal such that $$\lim_{k \to +\infty} \mathbb{E}[g'^{(T)}] \square \lim_{k \to \infty} \mathbb{E}[g^{(T)}]. \tag{19}$$

The time-delay of the watermarking signal is selected from the time window $\{1, 2, \ldots, \bar{\tau}\}$, either for every time step t or for a predetermined time interval comprising a number of consecutive time steps, according to a predetermined probability mass function (pmf) $p_\tau$. For example, the probability for $\tau(t)=1$ can be $p_1$, the probability for $\tau(t)=2$ can be $p_2$, and so on. The process for determining a suitable scale factor $K_\tau$ and a suitable time-delay pmf $p_\tau$ can include the following steps.

The process for determining a suitable scale factor $K_\tau$ and a suitable time-delay pmf $p_\tau$ should be chosen so that $$G := \text{trace}\left[\lim_{t \to +\infty}\left(\text{Var}(\hat{x}'_{t|t-1} - \hat{x}_{t|t-1}) + \sum_V\right)C^T \sum_R^{-1} C\right] + $$
$$2 \cdot \text{trace}\left[\lim_{t \to +\infty}\left(\text{Cov}(\hat{x}'_{t|t-1} - \hat{x}_{t|t-1}, x'_t - \hat{x}_{t|t-1}) + \sum_V\right)C^T \sum_R^{-1} C\right] > 0$$

and this means that $$\lim_{k \to +\infty} g'^{(T)}_k =$$
$$\lim_{k \to +\infty} g^{(T)}_k + \text{trace}\left[\lim_{t \to +\infty}\left(\text{Var}(\hat{x}'_{t|t-1} - \hat{x}_{t|t-1}) + \sum_V\right)C^T \sum_R^{-1} C\right] + G,$$

that automatically satisfies (19).

Based on the above constructed matrices, one can construct matrices $\mathbb{W}_1$ and $\mathbb{W}_2$ as $\mathbb{W}_1 := \sum_{l=-\bar{\tau}}^{\bar{\tau}} \Gamma \, \mathbb{D} \, \Gamma^T \tilde{A}^{-lT}$ and $$\mathbb{W}_2 := \sum_{l=-\bar{\tau}}^{\bar{\tau}} \tilde{A}^{-l} \Gamma \, \mathbb{D} \, \Gamma^T.$$

The steady state error covariance matrix of the Kalman filter defined by Equation (14) can be constructed as:

$$E = \lim_{k \to +\infty} \mathbb{E}\left[(x'_t - \hat{x}'_{t|t-1})(x'_t - \hat{x}'_{t|t-1})^T\right]. \tag{20}$$

At this point, one can verify whether $\mathbb{W}_1 + \mathbb{W}_2$ is positive definite. If not, the scale matrix $K_\tau$ and pmf $p_\tau$ need to be redesigned. The following equation for $\mathbb{U}$ can be solved:

$$\tilde{A} \mathbb{U} \tilde{A}^T - \mathbb{U} + \frac{1}{2}(\mathbb{W}_1 + \mathbb{W}_2) = 0. \tag{21}$$

One can further verify whether $\mathcal{P} \mathbb{U} \mathcal{P}^T + \mathcal{Q} \mathbb{U} \mathcal{Q}^T > E$. If not, $K_\tau$ and $p_\tau$ need to be redesigned. The attack mode detector is equal to:

$$\lim_{k \to +\infty} g'^{(T)}_k = \lim_{k \to +\infty} g^{(T)}_k + \text{trace}\left[(\mathcal{Q} \mathbb{U} \mathcal{Q}^T + \mathcal{P} \mathbb{U} \mathcal{P} - E)\left(C^T \sum_R^{-1} C\right)\right] T$$

that satisfies condition (19).

A crucial challenge in the watermarking-based secure-control scheme is that the controller is not designed to take into account the watermarking signal (e.g., as defined in (13)). The nominal LQG controller generates a feedback control to minimize the cost function (as defined in (9)) such that $u_t^{LQG} = \arg\min J(u)$. When the feedback control signal is augmented with the watermarking signal, the cost J increases, and there is an inherent trade-off between detectability and system performance, as demonstrated in FIG. 1A. However, compared with the conventional noise-based watermarking scheme that is largely controlled by the intensity covariance matrix U, this delay-induced watermarking scheme can provide a richer design space that includes $K_\tau$, $p_\tau$, and a domain of $\tau$. The closed loop dynamics now cease being Gaussian because a random process can be chosen freely (e.g., at each time step or each time interval comprising multiple steps, a randomly delayed state can be chosen). This feature provides a richer configuration space to design efficient watermarking signals that can guarantee better and faster detectability in the event of a replay attack with lower system degradation.

Figure 3A:
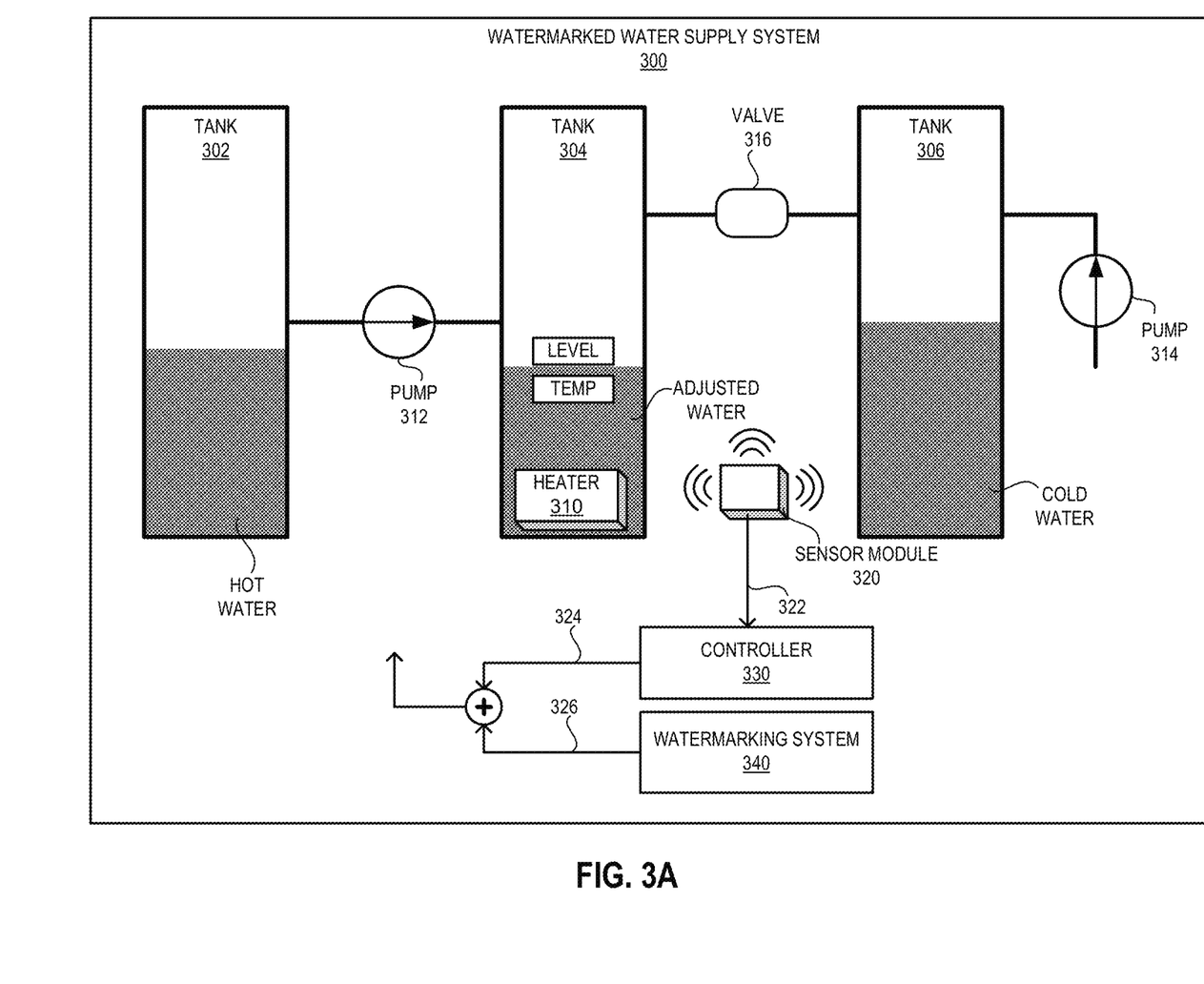
FIG. 3A illustrates an exemplary use case of the delay-induced watermarking scheme, according to one embodiment.

FIG. 3A illustrates an exemplary use case of the delay-induced watermarking scheme, according to one embodiment. In this example, a watermarked water supply system 300 that can facilitate a controlled chemical process is shown. System 300 can be controlled by a LQG controller 330 that generates a control signal 324 for regulating the state of system 300. A watermarking system 340 can be embedded into system 300 for injecting watermarking signal 326 into control signal 324.

System 300 can include water tanks 302, 304, and 306. Water tanks 302 and 306 hold hot and cold water, respectively, and water tank 304 holds water with an adjustable level and temperature. The system state $x=(x_1, x_2, x_3)^T$ can indicate the level of water in tanks 304 and 306 and the temperature of water in tank 304. The control inputs can be respective control signals to flow pumps 312 and 314, valve 316, and heater 310 from controller 330. The objective of controller 330 is to regulate the state vector around a reference value that dictates the target level of water in tanks 304 and 306 and the target temperature of water in tank 304.

System 300 can include a sensor module 320 that can provide sensor measurements 322 indicative of water levels in tanks 304 and 306 and water temperature of tank 304. In some embodiments, system 300 can be observed by s sensors in sensor module 320. An attacker can record measurements 322 over a period and replay the recorded measurements while attacking system 300 by adding malicious data to measurements 322 to achieve a sequence of desired control signals from controller 330. Watermarking signal 326 allows a detector (i.e., the $\chi^2$ detector) to determine the replayed measurements and detect the attack on system 300.

Simulations of system 300 can be run to demonstrate the effectiveness of the watermarking signal in detecting replay attacks. In an exemplary simulation, the process noise and the sensor noise have been assumed to be zero-mean Gaussian with covariance W=0.5 I and V=0.1 I, respectively. The linearized dynamics of system 300 can be assumed as:

$$A = \begin{bmatrix} 0.96 & 0 & 0 \\ 0.04 & 0.97 & 0 \\ -0.04 & 0 & 0.9 \end{bmatrix} \text{ and } B = \begin{bmatrix} 8.8 & -2.3 & 0 & 0 \\ 0.2 & 2.2 & 4.9 & 0 \\ -0.21 & -2.2 & 1.9 & 21 \end{bmatrix},$$

and the matrices C and D can be assumed to be identity, i.e., C=D=I.

In one example, the observation window of the $\chi^2$ detector can be chosen as T=85, the threshold $\eta$=110, the minimum and maximum time delay are set as $\tau_{min}$=50 and $\tau_{max}$=200, respectively. The total time of simulation can be 7000 steps. The performance metric to measure the system response is considered as the linear quadratic regulator (LQR) cost (as defined in Equation (9)) with the following weighting matrices: $Q_s$=diag[0.3, 0.3, 2.4] for state cost, $Q_s$=diag[0.1, 0.1, 0.1] for cost corresponding to integrator state, and R=diag[1, 1, 1, 1].

Figure 3B:
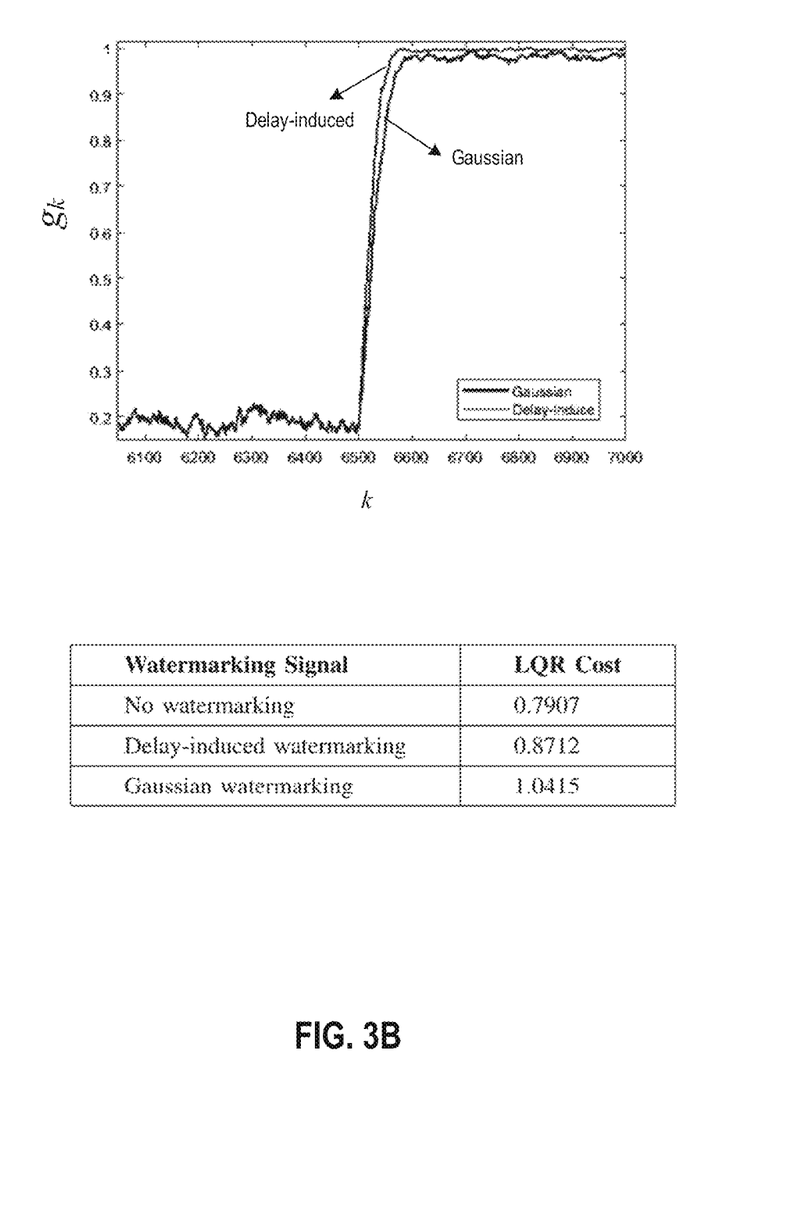
FIG. 3B compares the performance of the Gaussian-noise-based watermarking and the delay-induced watermarking schemes for a three-tank system, according to one embodiment.

FIG. 3B compares the performance of the Gaussian-noise-based watermarking and the delay-induced watermarking schemes for the three-tank system shown in FIG. 3A, according to one embodiment. The top drawing of FIG. 3B compares the detection rates of the two watermarking schemes. In this example, the output of the system is recorded between $t_{start}$=6000 and $t_{end}$=7000, and the replay attack starts at $t_{attack}$=6500. As can be seen from FIG. 3B, the delay-induced watermarking scheme can result in a faster and an overall better detection scheme. The table shown at the bottom of FIG. 3B compares the LQR cost for three scenarios, no watermarking, using the delay-induced watermarking, or using the Gaussian-noise-based watermarking. As can be seen from the table, the delay-induced watermarking scheme can result in a lower LQR cost compared with the Gaussian-noise-based watermarking scheme (e.g., approximately 20% lower).

Figure 4:
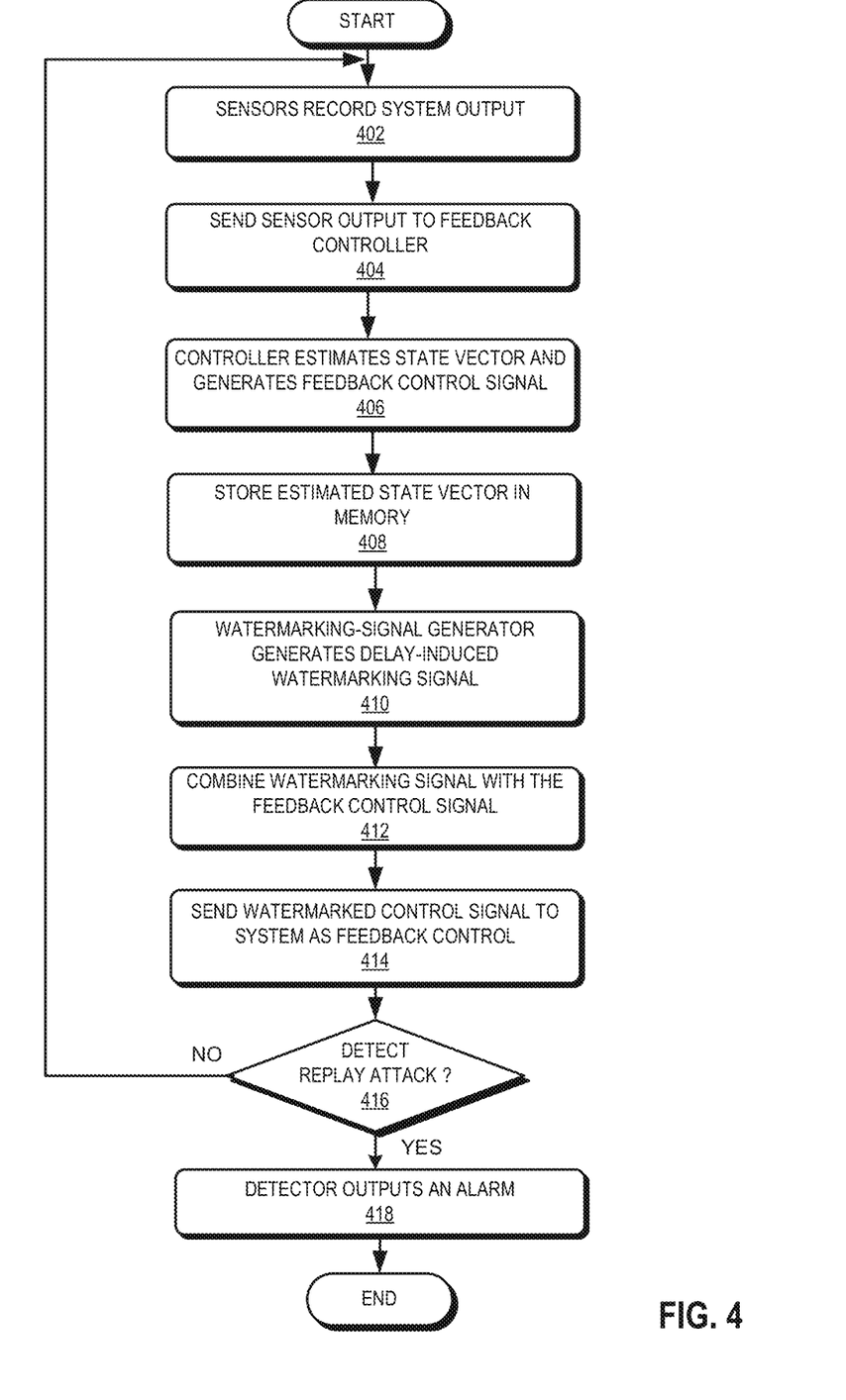
FIG. 4 presents a flowchart illustrating an exemplary process for implementing the delay-induced watermarking scheme to protect a cyber-physical system from replay attacks, according to one embodiment.

FIG. 4 presents a flowchart illustrating an exemplary process for implementing the delay-induced watermarking scheme to protect a cyber-physical system from replay attacks, according to one embodiment. During the operation of the cyber-physical system, a number of sensors in the system can measure the output of the system (operation 402), which can be an imperfect measurement of the state of the system. The output of the sensors can be sent to a feedback controller (operation 404). In some embodiments, the feedback controller can implement an LQG control scheme to estimate the state vector of the system and generate a feedback control signal (operation 406). For example, the feedback controller can include a Kalman-filter-based state estimator that estimates the system state vector according to the dynamics shown in Equations (14) and (15).

The estimated state vector can be stored in a memory for future usage (operation 408). In some embodiments, the memory can be configured to store the estimated state vector within a time window of a predetermined duration. Newly arrived estimated state vectors may evict older state vectors. For a discreate-time system, the memory can be configured to store a predetermined number of estimated state vectors.

A watermarking-signal generator can generate a delay-induced watermarking signal based on the stored time-delayed state vectors (operation 410). In some embodiments, the watermarking-signal generator can first generate a random time delay within a predetermined range based on a predetermined pmf. The pmf can be a Gaussian distribution function, a uniform distribution function, or other types of random distribution functions. The random time delay has an upper and lower bound. In some embodiments, a random time delay can be generated at each time step. In alternative embodiments, a random time delay can be generated for a plurality of consecutive time steps. The watermarking-signal generator can also determine a scale factor. The watermarking signal can be generated by accessing the memory to obtain the time-delayed state vector based on the random time delay and then multiplying the time-delayed state vector by the scale factor. Note that, before applying the watermarking signal to the system under control, the watermarking-signal generator needs to verify whether the generated watermarking signal is admissible, i.e., whether the watermarking signal is within the acceptable input range and whether the watermarking signal will destabilize the system. In the three-tank example shown in FIG. 3A, the watermarking signal should not exceed the allowed water level and temperature of tank 304, and the watermarking signal should not cause volatile changes to the water level and temperature in tank 304. In some embodiments, the watermarking-signal generator can verify whether G>0 is true based on the scale factor and the predetermined pmf and/or boundaries of the random delay. If not, the watermarking-signal generator can select a different scale factor and a different pmf and/or boundaries of the time delay. The watermarking-signal generator typically can select a sufficiently small scale factor and a reasonable upper bound (e.g., not too big) of the time delay. In further embodiments, the watermarking-signal generator can tune the magnitude (i.e., the scale factor) of the time-delayed watermarking signal and the pmf and/or range of the random time delay to obtain an optimal watermarking signal that satisfies condition (19).

The delay-induced watermarking signal can be combined with the control signal generated by the feedback controller to generate a watermarked control signal (operation 412). The watermarked control signal can be sent to the system under control as feedback control (operation 414). Sending the watermarked control signal to the system can involve applying the watermarked control signal to various control components of the system (e.g., heater 310, pumps 312 and 314, and valve 316 of system 300 shown in FIG. 3A) such that the state of the system can be regulated according to the watermarked control signal. More specifically, the dynamic of the state of the system can be regulated by the watermarked control signal based on Equation (1). A $\chi^2$ detector determines whether a replay attack occurs based on the system output and the estimated state within a predetermined time window (operation 416). If a replay attack is detected, the detector outputs an alarm signal, indicating the detection of an attack (operation 418). In some embodiments, the $\chi^2$ detector can monitor the residue signal and compute $g^{(T)}$, and if $g^{(T)}$ exceeds a predetermined threshold, the detector can output an alarm signal. If no relay attack is detected, the system continues to operate (operation 402).

Figure 5:
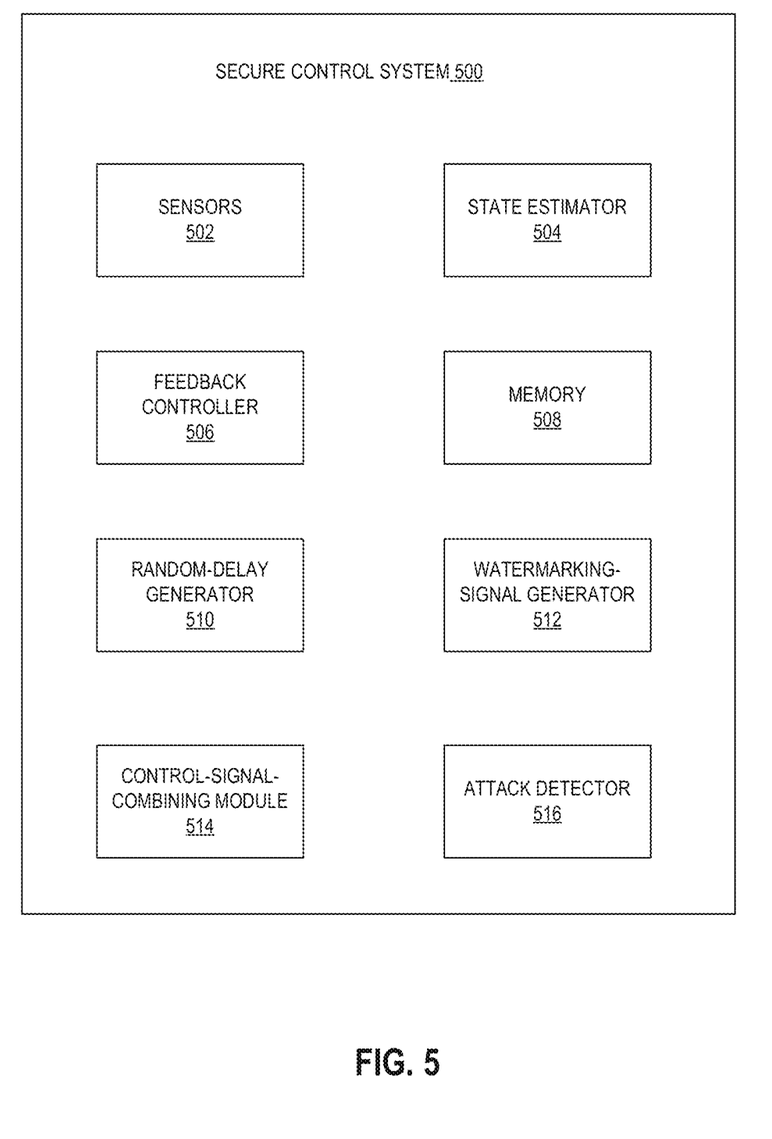
FIG. 5 presents a block diagram of an exemplary secure control system implementing the delay-induced watermarking scheme, according to one embodiment.

FIG. 5 presents a block diagram of an exemplary secure control system implementing the delay-induced watermarking scheme, according to one embodiment. Secure control system 500 can include one or more sensors 502, a state estimator 504, a feedback controller 506, a memory 508, a random-delay generator 510, a watermarking-signal generator 512, a control-signal-combining module 514, and an attack detector 516. The various modules included in secure control system 500 can be implemented using hardware components, software components, or both.

Sensors 502 can measure the output of a system under control, which can be a CPS that is vulnerable to replay attacks. Due to process noise as well as the sensor noise, the output of sensors 502 can be an imperfect measurement of the state of the system under control. State estimator 504 and feedback controller 506 together can generate a feedback control signal that can regulate the state of the system under control to place the system in a desired state. More specifically, feedback controller 506 can be an LQG controller implementing the LQG control scheme, and state estimator 504 can estimate the state based on the output of sensors 502 and the feedback signal.

Memory 508 can store the past estimated state of the system within a time window of a predetermined duration. In some embodiments, memory 508 can store just enough past states needed for generating the delay-induced watermarking signals. In other words, the boundaries of the time window can be the lower and upper boundaries of the time delay. In alternative embodiments, memory 508 can store more states than what is needed for generating the delay-induced watermarking signals. In such a case, the boundaries of the time window can encompass the lower and upper boundaries of the time delay.

Random-delay generator 510 can be responsible for generating a random time delay based on a predetermined pmf. In some embodiments, the system is a discrete-time system, and generating the random delay may comprise randomly selecting a time sample within the aforementioned time window or within the predetermined lower and upper boundaries of the time delay. Watermarking-signal generator 512 can be responsible for generating an admissible watermarking signal based on the past states stored in memory 508, the random delay generated by random-delay generator 510, and a predetermined scale factor. More specifically, watermarking-signal generator 512 can select a past state from memory 508 based on the generated random delay. For example, if the current time instant is t, the generated random delay is $\tau_t$, then the selected state can be the state of the system at time $t-\tau_t$ (i.e., $x_{t-\tau_t}$). Note that random-delay generator 510 can generate a random delay at each time instant (e.g., generate a unique $\tau_t$ for each t) or generate a random delay for a predetermined short duration (e.g., generate the same $\tau_t$ for $t_0 < t < t_1$).

Watermarking-signal generator 512 can then multiply the obtained past state by the predetermined scale factor to generate the watermarking signal. In some embodiments, watermarking-signal generator 512 can determine whether the watermarking signal is admissible to the system and whether the generated watermarking signal would destabilize the system when being added to the system as part of the feedback control signal. More specifically, watermarking-signal generator 512 can tune the scale factor as well as the pmf used by random-delay generator 510 to ensure that the generated watermarking signal is admissible to the system and will not lead to instability. Due to the randomness of the time delay (either at each time step or at multiple time steps), the delay-induced watermarking signal is non-repeatable, thus making it possible to detect the replay attack.

Control-signal-combining module 514 can be responsible for combining the feedback control signal generated by feedback controller 506 and the watermarking signal generated by watermarking-signal generator 512. The combined signal can be referred to as a watermarked feedback control signal. Control-signal-combining module 514 can further send the watermarked feedback control signal as control input to the system in order to regulate the state of the system to achieve the desired system state.

Attack detector 516 can be responsible for monitoring the residue signal to determine whether a replay attack occurs. In some embodiments, attack detector 516 can include a chi-square detector. The observation window of the chi-square detector can be selected based on the properties of the system. With appropriately designed watermarking system, attack detector 516 can effectively detect the occurrence of the replay attack. For example, attack detector 516 can monitor the residue signal and compute $g_k^{(T)}$ according to Equation (3). In response to detecting that $g_k^{(T)}$ exceeds a predetermined threshold (e.g., as shown in the top drawing of FIG. 3B), attack detector 516 can output an alarm signal.

Figure 6:
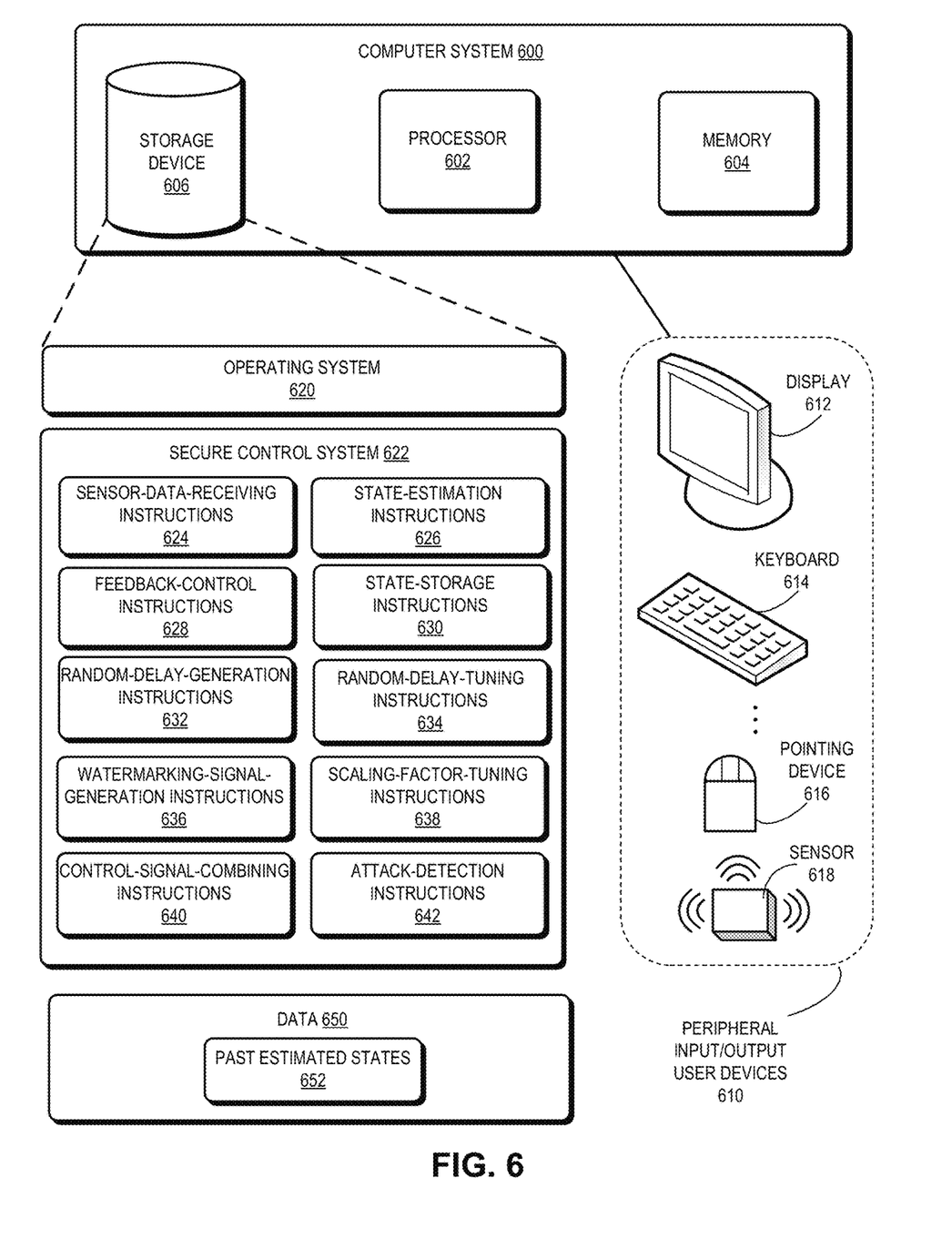
FIG. 6 illustrates an exemplary computer system that facilitates the secure control of a physical system, according to one embodiment.

FIG. 6 illustrates an exemplary computer system that facilitates the secure control of a physical system, according to one embodiment. Computer system 600 includes a processor 602, a memory 604, and a storage device 606. Furthermore, computer system 600 can be coupled to peripheral input/output (I/O) user devices 610, e.g., a display device 612, a keyboard 614, a pointing device 616, and a sensor 618 associated with the physical system under control. Storage device 606 can store an operating system 620, a secure control system 622, and data 650.

Secure control system 622 can include instructions, which when executed by computer system 600, can cause computer system 600 or processor 602 to perform methods and/or processes described in this disclosure. Specifically, secure control system 622 can include instructions for receiving measurement data from sensors associated with the physical system under control (sensor-data-receiving instructions 624); instructions for estimating the state of the physical system (state-estimation instructions 626); instructions for generating a feedback control signal based on the estimated state (feedback-control instructions 628); instructions for storing the estimated state (state-storage instructions 630); instructions for generating a random delay (random-delay-generation instructions 632); instructions for tuning the range and determining the pmf of the random delay (random-delay-tuning instructions 634); instructions for generating an admissible watermarking signal based on the past states of the physical system, the random delay, and a predetermined scale factor (watermarking-signal-generation instructions 636); instructions for tuning the scale factor (scaling-factor-tuning instructions 638); instructions for combining the watermarking signal with the feedback control signal (control-signal-combining instructions 640); and instructions for detecting the replay attacks (attack-detection instructions 642). Data 650 can include the past estimated states 652.

In general, the disclosed embodiments provide a system and method that facilitate the secure control of a physical system using delay-induced watermarking. A physical system operating in the presence of process noise can be controlled using a feedback control signal generated from the estimated state of the physical system and a delayed-and-scaled version of the estimated state as a watermarking signal. More specifically, the secure control system can store (e.g., in a memory) estimated states of the physical system within a time window of a predetermined length. At each time instant or step, a watermarking signal can be generated by randomly selecting, from the stored estimated states, an estimated state and by multiplying the selected estimated state with a predetermined scale factor. The watermarking signal can be combined with the feedback control signal, and the combination (referred to as the watermarked control signal) can be used as a control input to modulate the state of the physical system under control. The random selection of the estimated states can be based on a predetermined pmf of the time delay between the selected state and the current state. The range and pmf of the time delay and the magnitude of the scale factor need to be carefully selected to ensure that the watermarking signal is an admissible control input to the physical system under control and that the addition of the watermarking signal as the control input will not destabilize the physical system under control. Further, the range and pmf of the time delay and the magnitude of the scale factor can be tuned to ensure fast detection of a replay attack with minimal performance degradation of the control system. In addition to the chemical process system shown in FIG. 3A, this watermarking scheme can be applied to any type of control system that controls the operation of a physical system, such as an electrical system, a mechanical system, a hydraulic system, etc.

The methods and processes described in the detailed description section can be embodied as code and/or data, which can be stored in a computer-readable storage medium as described above. When a computer system reads and executes the code and/or data stored on the computer-readable storage medium, the computer system performs the methods and processes embodied as data structures and code and stored within the computer-readable storage medium.

Furthermore, the methods and processes described above can be included in hardware modules or apparatus. The hardware modules or apparatus can include, but are not limited to, application-specific integrated circuit (ASIC) chips, field-programmable gate arrays (FPGAs), dedicated or shared processors that execute a particular software module or a piece of code at a particular time, and other programmable-logic devices now known or later developed. When the hardware modules or apparatus are activated, they perform the methods and processes included within them.

The foregoing descriptions of embodiments of the present invention have been presented for purposes of illustration and description only. They are not intended to be exhaustive or to limit the present invention to the forms disclosed. Accordingly, many modifications and variations will be apparent to practitioners skilled in the art. Additionally, the above disclosure is not intended to limit the present invention. The scope of the present invention is defined by the appended claims.

What is claimed is:

1. A computer-implemented method for secure control of a physical system, the method comprising:
    obtaining measurement of one or more sensors associated with the physical system;
    estimating a state of the physical system based on the measurement of the sensors;
    generating a feedback control signal based on the estimated state;
    generating a watermarking signal based on a stored estimated state of the physical system at a previous time instant, wherein generating the watermarking signal comprises:
        generating a random delay within a predetermined time range based on a predetermined probability mass function;
        obtaining the stored estimated state based on the random delay such that a difference between the previous time instant and a current time instant equals the random delay; and
        multiplying the stored estimated state by a predetermined scale factor, which further comprise tuning the predetermined scale factor to ensure that the watermarking signal is within an admissible input range of the physical system;
    generating a watermarked control signal by combining the feedback control signal and the watermarking signal; and
    applying the watermarked control signal to the physical system to regulate the state of the physical system, thereby facilitating secure control of the physical system.

2. The method of claim 1, comprising performing a chi-square detection to detect a replay attack on the physical system.

3. The method of claim 2, further comprising outputting an alarm signal in response to detecting a replay attack.

4. The method of claim 1, wherein generating the feedback control signal comprises applying a linear-quadratic-Gaussian (LQG) control scheme.

5. The method of claim 1, wherein generating the random delay comprises:
    generating the random delay for each time instant; or
    generating the random delay for multiple consecutive time instants.

6. The method of claim 1, further comprising tuning the predetermined time range and/or the predetermined probability mass function to ensure that the watermarking signal does not cause instability in the physical system.

7. The method of claim 1, wherein the predetermined probability mass function comprises a Gaussian distribution function or a uniform distribution function.

8. A computer system for secure control of a physical system, the computer system comprising:
    a processor; and
    a storage device coupled to the processor and storing instructions, which when executed by the processor cause the processor to perform a method, the method comprising:
        obtaining measurement of one or more sensors associated with the physical system;
        estimating a state of the physical system based on the measurement of the sensors;
        generating a feedback control signal based on the estimated state;
        generating a watermarking signal based on a stored estimated state of the physical system at a previous time instant, wherein generating the watermarking signal comprises:
            generating a random delay within a predetermined time range based on a predetermined probability mass function;

obtaining the stored estimated state based on the random delay such that a difference between the previous time instant and a current time instant equals the random delay; and multiplying the stored estimated state by a predetermined scale factor, which further comprise tuning the predetermined scale factor to ensure that the watermarking signal is within an admissible input range of the physical system;

generating a watermarked control signal by combining the feedback control signal and the watermarking signal; and applying the watermarked control signal to the physical system to regulate the state of the physical system, thereby facilitating secure control of the physical system.

9. The computer system of claim 8, wherein the method comprises performing a chi-square detection to detect a replay attack on the physical system.

10. The computer system of claim 9, wherein the method further comprises outputting an alarm signal in response to detecting a replay attack.

11. The computer system of claim 8, wherein generating the feedback control signal comprises applying a linear-quadratic-Gaussian (LQG) control scheme.

12. The computer system of claim 8, wherein generating the random delay comprises:
generating the random delay for each time instant; or
generating the random delay for multiple consecutive time instants.

13. The computer system of claim 8, wherein the method further comprises tuning the predetermined range and/or the predetermined probability mass function to ensure that the watermarking signal does not cause instability in the physical system.

14. The computer system of claim 8, wherein the predetermined probability mass function comprises a Gaussian distribution function or a uniform distribution function.

15. A non-transitory computer-readable storage medium storing instructions that when executed by a computer cause the computer to perform a method for secure control of a physical system, the method comprising:

obtaining measurement of one or more sensors associated with the physical system;

estimating a state of the physical system based on the measurement of the sensors;

generating a feedback control signal based on the estimated state;

generating a watermarking signal based on a stored estimated state of the physical system at a previous time instant, wherein generating the watermarking signal comprises:

generating a random delay within a predetermined time range based on a predetermined probability mass function;

obtaining the stored estimated state based on the random delay such that a difference between the previous time instant and a current time instant equals the random delay; and multiplying the stored estimated state by a predetermined scale factor, which further comprise tuning the predetermined scale factor to ensure that the watermarking signal is within an admissible input range of the physical system;

generating a watermarked control signal by combining the feedback control signal and the watermarking signal; and applying the watermarked control signal to the physical system to regulate the state of the physical system, thereby facilitating secure control of the physical system.

* * * * *